United States Patent [19]

Takeda et al.

[11] Patent Number: 5,150,462
[45] Date of Patent: Sep. 22, 1992

[54] IMAGE DATA DISPLAY SYSTEM

[75] Inventors: Haruo Takeda, Kawasaki; Kuniaki Tabata, Tokyo, both of Japan

[73] Assignee: Hitachi, Ltd., Tokyo, Japan

[21] Appl. No.: 437,706

[22] Filed: Nov. 16, 1989

Related U.S. Application Data

[63] Continuation of Ser. No. 67,014, Jun. 29, 1987, abandoned.

[30] Foreign Application Priority Data

Jun. 27, 1986 [JP] Japan .............................. 61-149510

[51] Int. Cl.[5] .............................................. G06F 5/14
[52] U.S. Cl. .................................. 395/166; 395/164; 395/162; 340/750; 340/798; 340/799
[58] Field of Search ................ 364/518, 521; 340/747, 340/706, 750, 798, 799, 731; 395/162, 164, 166

[56] References Cited

U.S. PATENT DOCUMENTS

| | | | |
|---|---|---|---|
| 3,631,406 | 12/1971 | Kurner | 340/172.5 |
| 3,772,657 | 11/1973 | Marsalka et al. | 340/172.5 |
| 4,325,063 | 4/1982 | Herman | 340/750 |
| 4,412,294 | 10/1983 | Watts et al. | 364/518 |
| 4,653,021 | 3/1987 | Takagi | 364/900 |
| 4,660,029 | 4/1987 | Houda et al. | 340/744 |
| 4,665,555 | 5/1987 | Alker et al. | 382/41 |
| 4,679,038 | 7/1987 | Bantz et al. | 340/721 |
| 4,700,182 | 10/1987 | Ohgami | 340/750 |
| 4,707,153 | 11/1987 | Nishi et al. | 400/121 |
| 4,741,047 | 4/1988 | Sharpe, II | 382/56 |
| 4,748,511 | 5/1988 | Nichols et al. | 358/256 |
| 4,812,998 | 3/1989 | Maeda | 364/518 |
| 4,876,651 | 10/1989 | Dawson et al. | 364/449 |
| 4,879,666 | 11/1989 | Kembo | 364/519 |
| 4,958,302 | 9/1990 | Fredrickson et al. | 364/521 |

Primary Examiner—Gary V. Harkcom
Assistant Examiner—Phu K. Nguyen
Attorney, Agent, or Firm—Antonelli, Terry, Stout & Kraus

[57] ABSTRACT

An image data display system includes a file unit for storing image data is compressed form, a display unit for displaying image data, a table for storing address information of a plurality of image data to be read from the file unit, a buffer memory having a memory area corresponding to at least two image frames for temporarily storing image data read from the file unit, an expansion processor for expanding image data in the buffer memory, a bit map memory for storing expanded image data, an output unit for outputting image data in the bit map memory to the display unit, an input unit for inputting a first command instructing a successive display of image data and a second command instructing a halt of the successive display, and a control unit responsive to the first command for switching in a predetermined order the buffer memory area used for storing image data read from the file unit and the buffer memory area used by the expansion processor and successively reading image data from the file unit while referring to the table, and responsive to the second command for halting the read operation of image data from the file unit, whereby a desired image frame successively displayed is rendered in a still state by the second command from the input unit.

16 Claims, 8 Drawing Sheets

F I G. 1
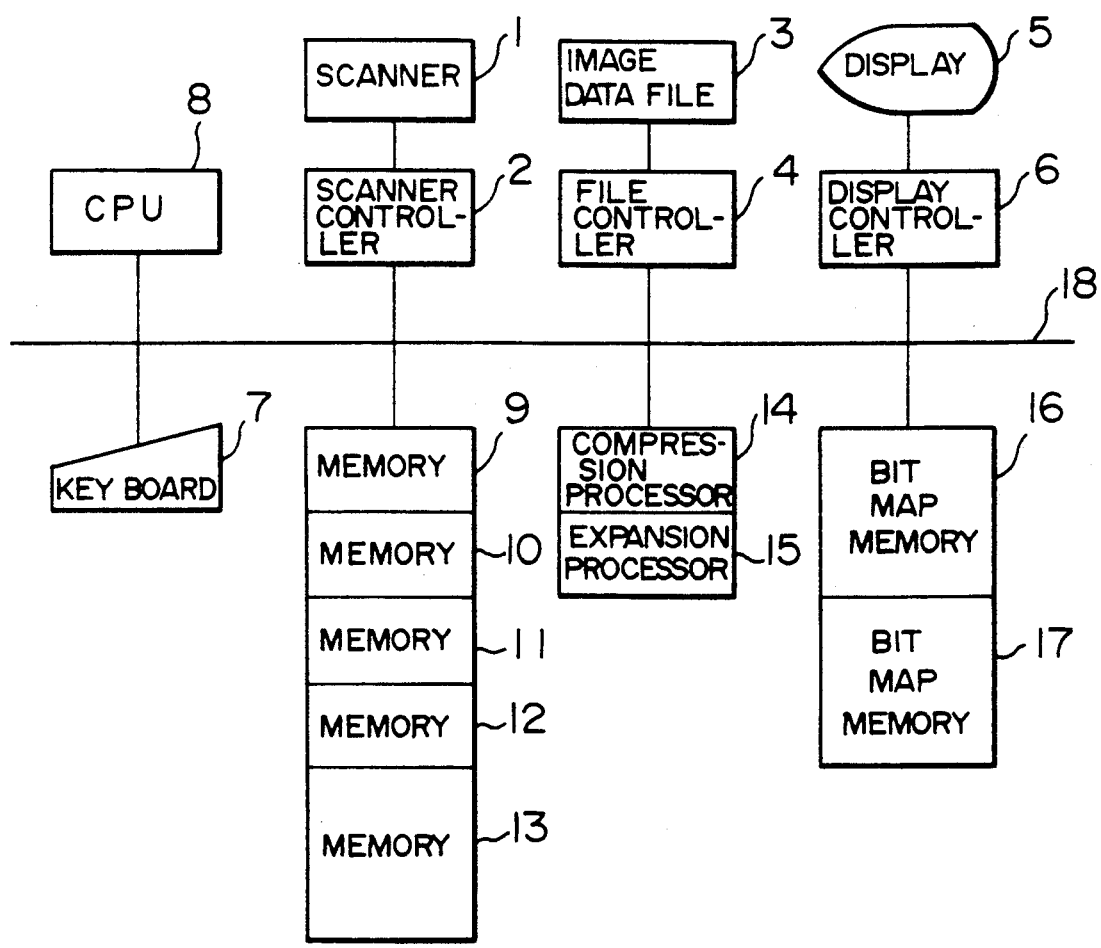

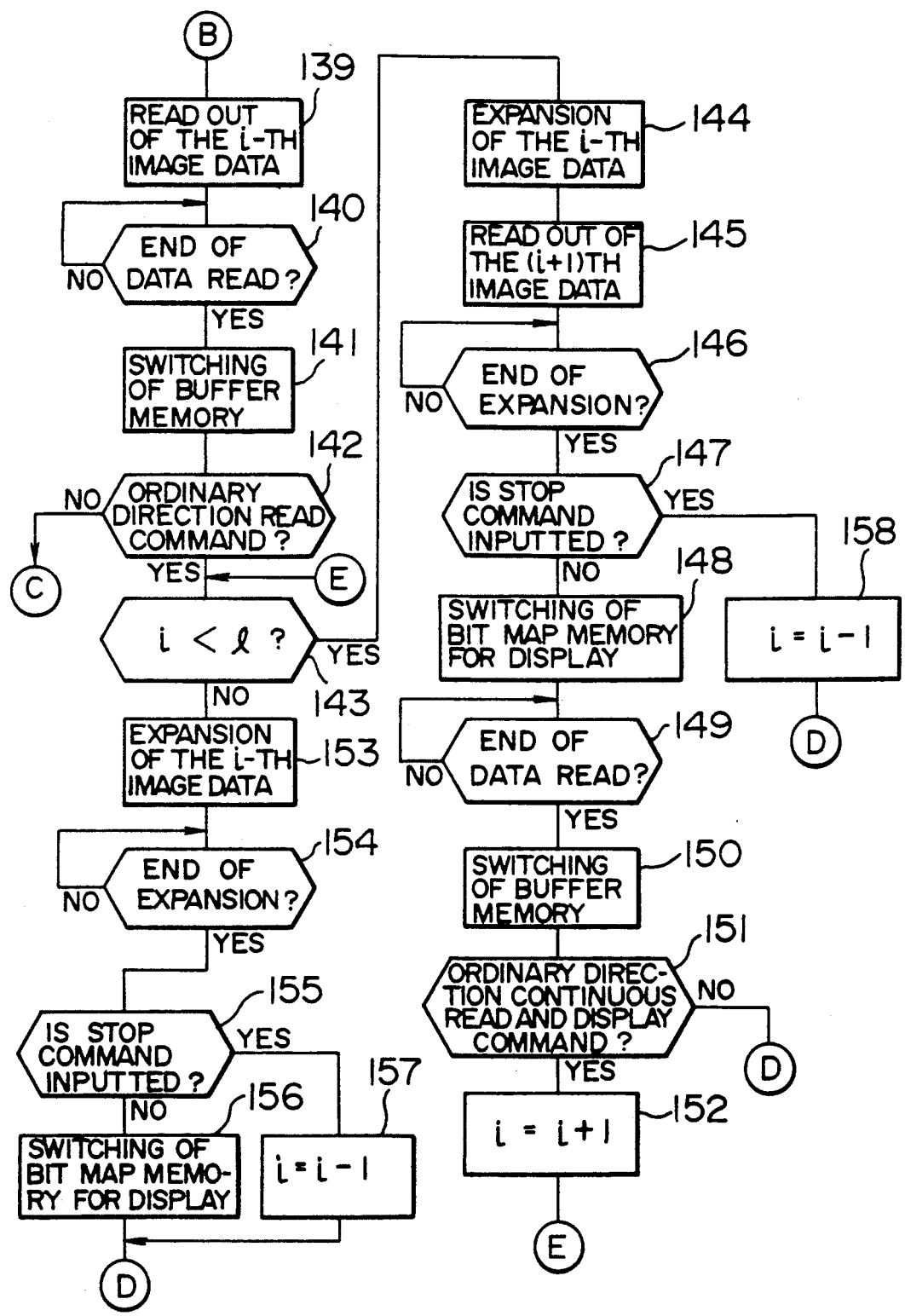

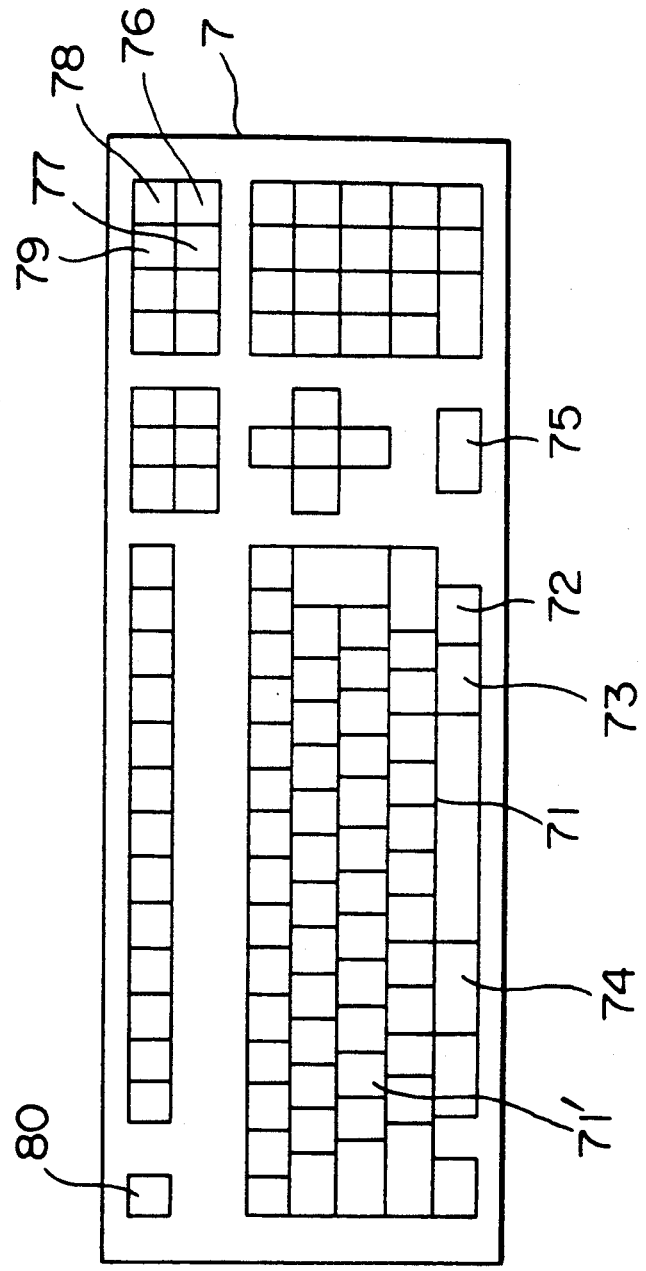

F I G. 4
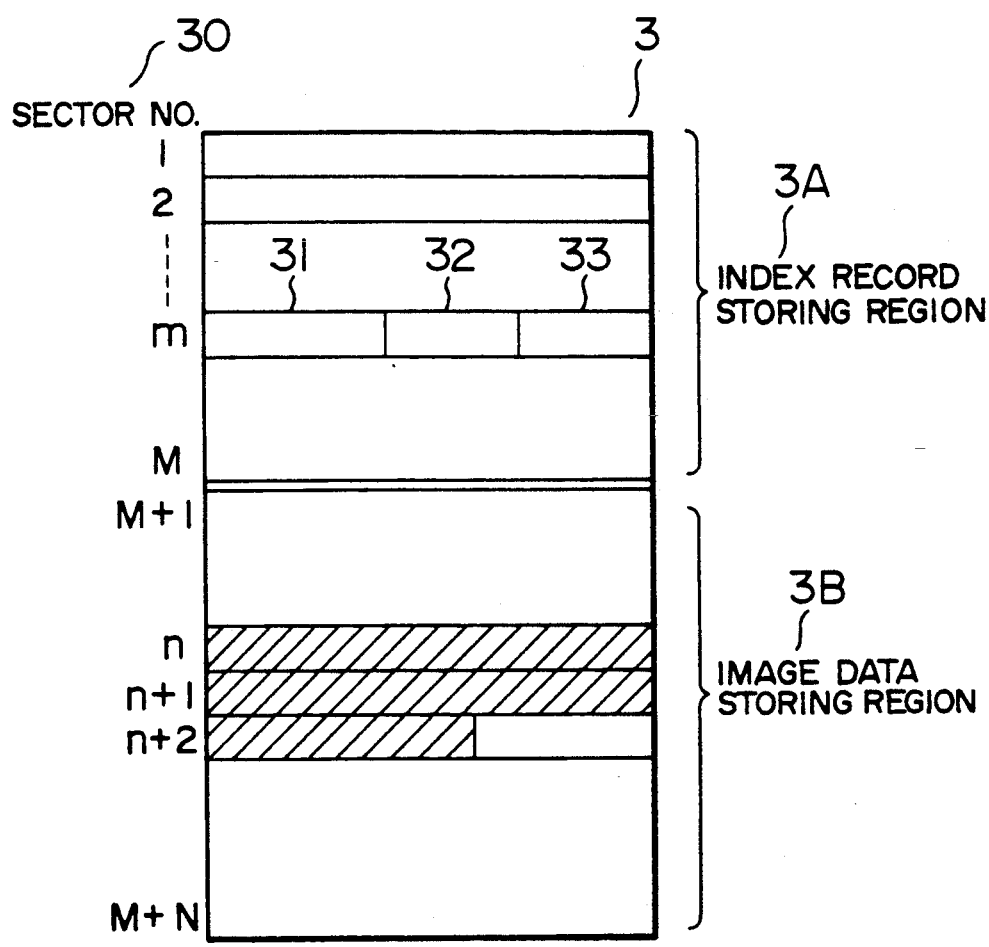

FIG. 5

| RECORD NO. (84) | CLASS OF INDEX (81) | HEAD ADDRESS OF IMAGE DATA (82) | SIZE OF IMAGE DATA (83) |
|---|---|---|---|
| 1 | SPEC. OF PATENT | n1 | S1 | 85-1
| 2 | SPEC. OF PATENT | n2 | S2 |
| ⋮ | | | |
| i | SPEC. OF PATENT | ni | Si | 85-i
| ⋮ | | | |
| ℓ | SPEC. OF PATENT | nℓ | Sℓ | 85-ℓ

80

IMAGE DATA DISPLAY SYSTEM

This application is a continuation of application Ser. No. 067,014, filed Jun. 29, 1987, now abandoned.

BACKGROUND OF THE INVENTION

The present invention relates to an image data display system and more particularly to an image data display system for sequentially displaying a plurality of image data read from an image file.

DESCRIPTION OF THE RELATED ART

Recently, a document image file system (electronic file) using a large capacity optical disc has become noticeable as a new means for document management. An optical disc has a large storage capacity enough to record image data and accordingly, can store document image information such as an account sheet, a design drawing, a contract and the like. An index such as a document name, a classification name or a key word may be used to retrieve a document. However, it takes time for an entry of a document image if a complicated index is added thereto. In addition, a complicated index often becomes difficult to be recalled when a document is to be retrieved. Therefore, a simple index such as a classification name is often used in practice. Further, a stored image having a complicated index is commonly retrieved designating a simple index. In this case, after inputting a simple index such as a classification name to retrieve an objective document, the operator must visually confirm the contents of a plurality of candidate data sequentially displayed on a display screen.

In a known document image retrieval method, for example, as disclosed in "Operation Manual (No. 60-10-001-20) for Optical Disc File System" by Hitachi at pp. 6 to 7, a page is turned one after another upon operation of a succeeding page key or a next page key. With this method, a table is provided for storing the file addresses of a plurality of images obtained by an index retrieval. The address (pointer) of an image to be displayed is changed by one in a predetermined order every time the key is operated. Based on the address, compressed (or coded) image data stored in the image file is sequentially read therefrom and expanded (or decoded) to display it on the display screen.

According to the above conventional image data display system, a key is operated for each image which in turn is read, expanded and displayed. This process is sequentially repeated if the number of image data to be displayed is large. Thus, there arises a problem that it takes a long time to retrieve an objective document.

SUMMARY OF THE INVENTION

It is an object of the present invention to provide an image data display system capable of visually selecting a desired image data in short time while a plurality of image data are sequentially and successively displayed at high speed.

To achieve the above object, the image data display system of this invention includes a file unit for storing image data in compressed form; a display unit for displaying image data; table means for storing address information of a plurality of image data to be read from the file unit; a buffer memory having a memory area corresponding to at least two frames for temporarily storing image data read from the file unit; means for expanding image data in the buffer memory; a bit map memory for storing expanded image data; means for outputting image data in the bit map memory to the display unit; input means for inputting a first command instructing a successive display of image data and a second command instructing a halt of the successive display; and control means responsive to the first command for switching in a predetermined order the buffer memory area used for storing image data read from the file unit and the buffer memory area used by the expansion means and successively reading image data from the file unit while referring to the table means, and responsive to the second command for halting the read operation of image data from the file unit; whereby a desired image frame on the display unit successively displaying image data can be rendered in a still state by the second command from the input means.

According to the present invention, as the operator inputs an index such as a classification name, a retrieval process starts forming a table having addresses of corresponding image data in the file. Then, as the operator inputs through a keyboard a command instructing a successive display of corresponding image data, a first compressed image data is read from the file in accordance with the first address in the table and stored in one memory area of the buffer memory. While the first compressed image data is expanded and displayed on the display unit, a second compressed image data is read from the file in accordance with the next address in the table and stored in another memory area of the buffer memory. Similarly, while the second, third and following image data are expanded and displayed, the third, fourth and following image data are read from the file. Thus, image data corresponding to the inputted index are sequentially and succeedingly displayed on the display unit at high speed. If an objective image data is displayed, the operator inputs through the keyboard a command instructing a stop of the successive display. A still image of the objective image data is thus obtained so that the operator can check the contents thereof precisely and, if necessary, perform various other processings such as printing and transmitting the contents.

The bit map memory may have a memory capacity corresponding to at least two image frames. In this case, while the contents of one frame memory area is displayed on the display unit, the other frame memory area is switched to store expanded image data. In this manner, a successive display instantaneously changing from one frame to another can be realized. Alternatively, the bit map memory may have a memory capacity corresponding to one frame. In this case, a successive display can be realized wherein while an image data expansion process continues, one frame image data is displayed and gradually changed to the other frame image data from the top or bottom of the former image data.

The foregoing and other objects, advantages, manner of operation and novel feature of the present invention will be understood from the following detailed description when read in connection with the accompanying drawings.

BRIEF DESCRIPTION OF THE DRAWINGS

FIG. 1 is a block diagram showing the overall construction of the image file system according to the present invention;

FIGS. 2A to 2C are flow charts illustrating an example of control operation of the image file system;

FIG. 3 is a plan view of the keyboard 7;

FIG. 4 is a memory map of the image file;

FIG. 5 shows a table for storing index records of image data to be retrieved.

DESCRIPTION OF THE PREFERRED EMBODIMENT

Figure 2A:
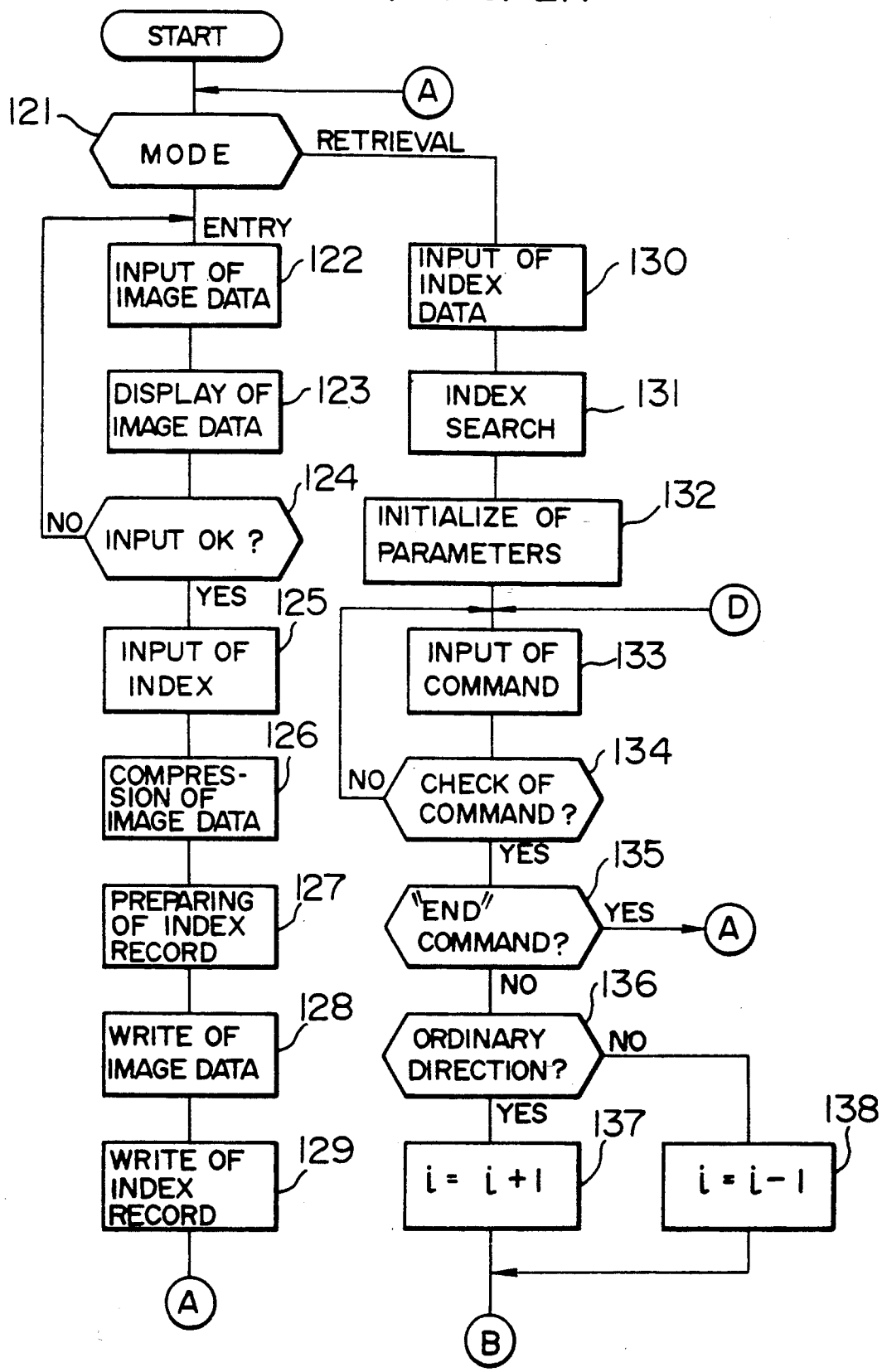

FIG. 1 shows the construction of the image file system which comprises: a scanner 1 for inputting image data; a controller 2 for the scanner 1; a file 3 including recording medium such as a magnetic disc and an optical disc and a driver unit for storing image data in compressed form; a controller 4 for controlling the operation of the file 3; a display unit 5 for displaying retrieved image data, character data and so on inputted from a keyboard 7, the keyboard being used for inputting a command, character data and specifically an index of image data; a controller 6 for controlling the display of the display unit 5; a CPU 8 for controlling the entire system; a program memory 9 for storing control programs for the CPU 8; a work memory 10 for storing variables, tables and so on used by the CPU 8; buffer memories 11 and 12 for temporarily storing compressed image data read from the file 3; a buffer memory 13 for temporarily storing original image data inputted from the scanner 1; a dedicated processor 14 for compressing (coding) original image data; a dedicated processor 15 for expanding (decoding) compressed image data; and bit map memories 16 and 17 in one-to-one correspondence with the contents displayed on the display unit 5. An instruction from the CPU 8 to the display controller 6 decides which memory contents is to be displayed on the display unit 5.

Based on an instruction from the CPU 8, the display controller 6 scans either the bit map memory 16 or the bit map memory 17 to refresh the display unit 5. In the above construction, the memories 9 to 13 and the bit map memories 16 and 17 are not always required to be physically independent, but a single memory device may be used logically to have the same construction as above. Further, as described later, some memory area may be used in common to reduce the overall memory capacity The compression processor 14 and the expansion processor 15 also are not always required to be independent devices since they have a common circuit portion and are often implemented on the same LSI circuit in practical use.

Figure 2C:
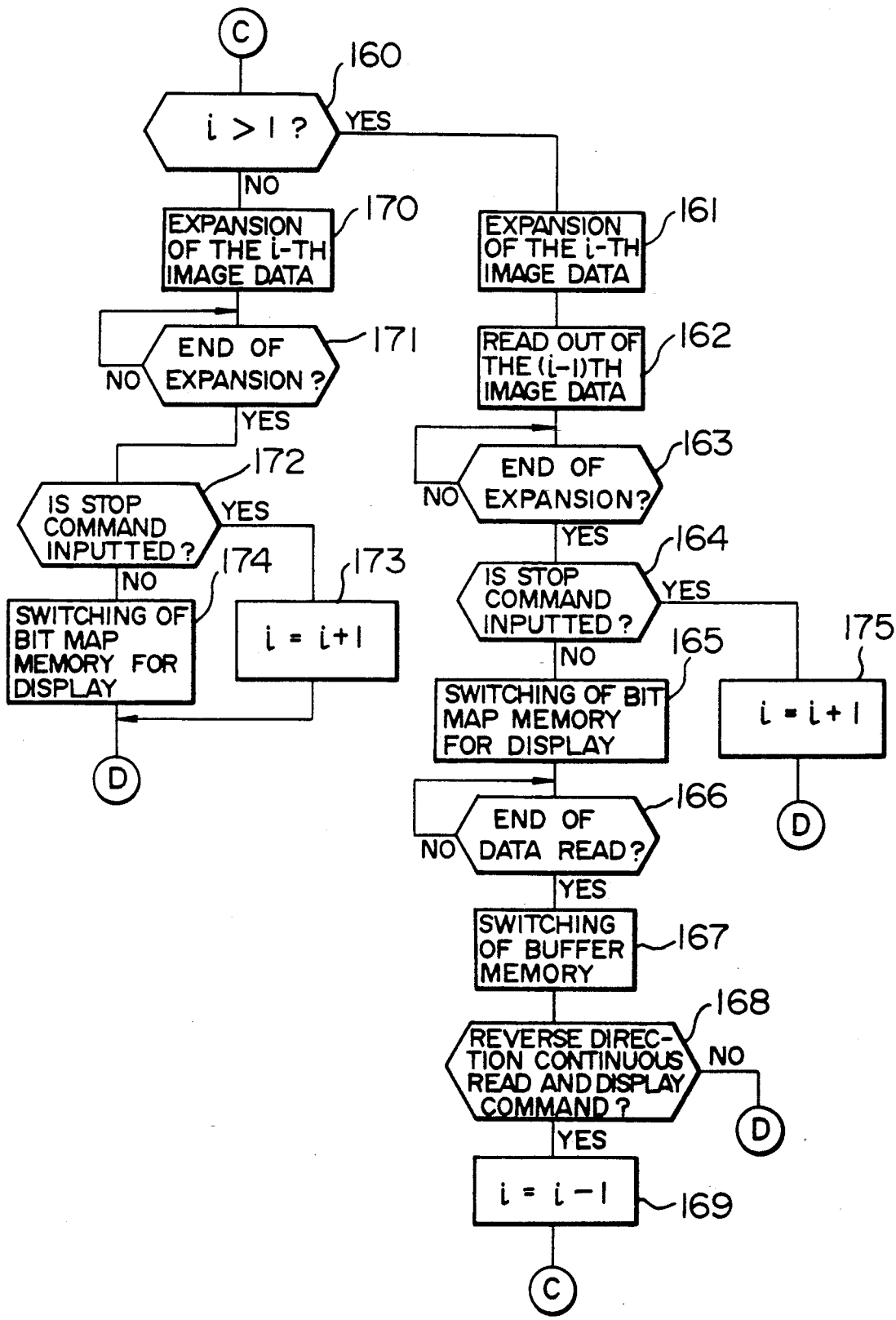

FIGS. 2A to 2C are flow charts showing an example of the operation of the image file system according to the present invention. The control programs shown by the flow charts are stored in the memory 9 and executed by the CPU 8. Entry and retrieval functions or modes can be selected at the initial condition. If an entry mode is selected through the keyboard 7, the following steps 122 to 129 are executed.

At step 122, image data inputted through the scanner 1 is temporarily stored in the image memory 13. The image data stored in the image memory 13 is transferred at step 123 to the bit map memory 16 and displayed on the display unit 5. If the operator determines that the image quality on the display unit, i.e., image inclination, position, brightness and so on, is good, then the operator can input an index of the image data inputted through the keyboard 7 to the work memory 10 (step 125). Used as the index of image data in this embodiment are only those characters designating the classification of image data, e.g., "patent specification", "thesis", "report" and so on. An example of the keyboard for inputting an index is shown in FIG. 3. To input an index of Chinese "Kanji" character string using this keyboard, the process similar to that by an ordinary word processor is carried out. Namely, a key 72 is first depressed to enter a Japanese "hirakana" character input mode and thereafter, Japanese "katakana" characters obtained through phonetic translation of the Chinese "Kanji" character string is sequentially inputted, for example, in units of words by using keys 71. Lastly, a conversion key 73 is depressed to convert the inputted "katakana" characters into Chinese "Kanji" characters. If alphabet or "hiragana" characters are used for inputting an index character string, a non-conversion key 74 instead of the key 73 is used. The end of inputting an index character string is instructed by depressing an execution key 75 in this embodiment.

The input image data stored in the memory 13 is compressed (decoded) by the compression processor 14 at step 126 and stored in the buffer memory 11. Various image data compression methods have been proposed. The methods such as the Modified Huffman method, the Modified Read (Relative Element Address Designate) method and the like may be used, which methods are disclosed for example in a Japanese literature entitled "Image Signal Processing for FAX and OA" by Takehiko FUKINUKE published by Nikkan Kogyo Newspaper, at pp. 61 to 106. At step 127, an index record is formed and stored in the memory 10. The index record includes the index indicating the classification of image data, the size (e.g., byte number) of compressed image data, and the address at the file 3 where the image data is stored as described later. The compressed image data stored in the memory 11 is written in an image data storing region of the file 3 described later (step 128). Next, the index record in the memory 10 is written in an index record storing region as described later (step 129).

FIG. 4 schematically shows the memory map of a storage area of the file 3. The storage area of the file 3 is divided into an image storing region 3B for storing image data and an index record storing region 3A for storing index records used in retrieving image data. The data address in a file using a magnetic disc or an optical disc is generally identified by a track number and a sector number in the track. For the purpose of simplifying the description, it is here assumed that the address for input/output of image data can be designated only by a sector number 30 specifically allocated to all the sectors in the file. In the image data storing region 3B, one set of image data is stored in three sectors n, n+1, and n+2 indicated by oblique lines. The effective data at the sector n+2 is present only at the part where oblique lines are shown. A sector m in the index record storing region 3A is an index record region for the above image data. A character string indicating the classification name is stored in field 31, the head sector number (i.e., n) of the corresponding image data in field 32, and the size of the image data (i.e., byte number of all the parts with oblique lines in the region 3B) in field 33. In case a write-once type optical disc without a capability of physical rewriting of recording information, generally the size M of the index record storing region 3A is defined at the initialization process whereby the index record is written from the sector 1 and the image data is written from the sector M+1 for each image data entry.

Next, steps 130 to 175 will be described which is executed when a retrieval process is designated at step 121 of FIG. 2A. Similar to step 125, the index of an objective image data, e.g., a character string "patent specification" indicating the classification name, is inputted to the work memory 10 through the keyboard at step 130. With the designated index, data in the index record storing region 3A are sequentially read from the memory 10 to compare them with the inputted index and collect those index records having the same index as the designated index. In accordance with the results of this index search, a table 80 shown in FIG. 5 is formed in the memory 10.

The table 80 is comprised of ( index records 85-1 to 85-l corresponding to the designated index. Each index record is constructed of an index 81 corresponding to the field 31 shown in FIG. 4, a head address 82 of image data corresponding to the field 32, and a size 83 of image data corresponding to the field 33. The index 81 in this embodiment has only one item of classification. However, if the index 31 in the file 3 is comprised of a plurality of items such as classification, number and entry date, the index 81 is accordingly divided into corresponding items. The table 80 is formed by obtaining the index records having the classification name "patent specification" at step 131 and transferring them one after another to the table region in the memory 10. At step 132, the parameter i is initialized to "0", the parameter indicating the index record number 84 in the index table 80 for the image data to be displayed on the display unit. Also at step 132, the buffer memory 11 is designated as a memory for use in storing image data to be read from the image file 3, the buffer memory 12 as a memory for use in storing image data to be read and expanded, the bit map memory 16 as a memory for use in storing the expanded image, and the bit map memory 17 as a memory for use in reading and displaying image data.

Next, as the operator inputs a command (step 133), the availability of the command is checked (step 134). The allowable commands include, for example, those by a command key 78 for reading the retrieved image data in an ordinary direction and successively displaying them, by a command key 76 for reading and displaying one page at a time in an ordinary direction, by a command key 79 for reading the retrieved image data in a reverse direction and succeedingly displaying them, by a command key 77 for reading and displaying one page at a time in a reverse direction, and by a command key 80 for stopping the retrieval process. If the image data with the last index record number ( is being displayed on the display unit, the display commands in the ordinary direction inputted by the operator are made invalid. Similarly, if the image data with the index record number 1 is being displayed or if the system is in the initialized condition, the display commands in the reverse direction are made invalid. If an end command is inputted, the system resumes the initialized condition (step 135). It is checked at step 136 if the inputted command is a read/display command in the ordinary direction or in the reverse direction. In case of a read/display command (corresponding to key 76 or 78) in the ordinary direction, the parameter i is incremented by 1 (step 137), whereas in case of a read/display command (corresponding to key 79 or 77) in the reverse direction, the parameter i is decremented by 1 (step 138). Thereafter, the flow advances to step 139.

At step 139, referring to the table 80 and based on the contents of the items 82 and 83 of the index record 85-i corresponding to the parameter i, the image data is read from the file 3 and stored in the buffer memory 11 or 12. Selection of the buffer memory is determined by the condition at that time. In the initialized condition, the buffer memory 11 designated at step 132 is selected. After confirming the completion of reading image data at step 140, switching of the buffer memories is effected for storing the next image data to be read from the file 3. Switching from the memory 11 to the memory 12 is effected at this time, and switching from the memory 12 to the memory 11 is effected at the next time. Following this step, the flow advances to steps 143 to 158 in case where a read/display command inputted at step 133 is in the ordinary direction, whereas the flow advances to steps 160 to 175 in case of the reverse direction.

It is checked at step 143 if the parameter i is smaller than the retrieved index record number l. If YES at step 143, the image data corresponding to the parameter i is expanded. The i-th image data stored in the buffer memory 11 in the initialized condition is expanded and transferred to the bit map memory 16 or 17 (16 in the initialized condition). The image data corresponding to the i+1 th index record number, i.e., the second image data, is read from the buffer memory 12 at step 145. The expansion process at step 144 and the read process at step 145 are executed in parallel using the bus 18 time divisionally. After confirming the completion of the expansion process at step 146, step 147 follows whereat is confirmed if there is an end command from the operator, i.e., if the operator wishes to stop the successive display of image data and to check the presently displayed image data precisely. If not, the flow advances to steps 148 to 152. If there is an end command, the parameter i is decremented by 1 (step 158) and the flow returns to step 133.

The bit map memories are switched to select the one for displaying the image data on the display unit 5 at step 148. Since the bit map memory 17 has been selected as the one for displaying the image data on the display unit 5 in the initialized condition, switching from the bit map memory 17 to the memory 16 is effected at this time. Simultaneously therewith, the bit map memory for storing image data to be expanded later at step 144 is switched to the bit map memory other than the above memory for the display. Since the bit map memory 17 has been selected for the display, the other bit map memory 16 is switched to store the image data to be expanded. After confirming the completion of image data reading process at step 149, switching to the buffer memory for storing image data read from the file 3 is effected at step 150. Since the buffer memory 11 was designated at step 132 and the buffer memory 12 has been selected at step 141, the buffer memory 11 is selected at step 150. An inputted command is checked at step 151. If there is still a successive read/display command in the ordinary direction, the flow advances to step 152 whereat the parameter i of the index record of the image data to be retrieved is incremented by 1 and thereafter, the flow returns to step 143. If an inputted command at step 151 is changed, the flow returns to step 133.

With the above processes, image data indicated by the index table 80 are sequentially read from the file 3, expanded and sequentially and successively displayed on the display unit. After such processes, if i=l at step 143, i.e., if it is determined that the last image data as indicated by the index table 80 has been read from the file 3, the succeeding steps as above are not required but steps 153, 154 to 156 and 157, corresponding to steps 144, 146 to 148 and 158, are executed.

If a read/display command in the reverse direction is inputted at step 133, steps 160 to 175 are executed after steps 134 to 136, 138, and 139 to 142. These steps are similar in case of the read/display command in the ordinary direction, except steps 160, 162, 169, 173 and 175. If i=1 at step 160, i.e., if it is determined that the image data to be retrieved is the first data indicated by the index table, the read process in the reverse direction is not requested. Thus, only steps 170 to 174, corresponding steps 161, 163 to 165 and 175, are executed. Contrary to step 145, the preceding image data is read at step 162. Also, contrary to step 152, the parameter i is decremented by 1 at step 169 and the following steps 160 to 169 are repeated.

Figure 6:
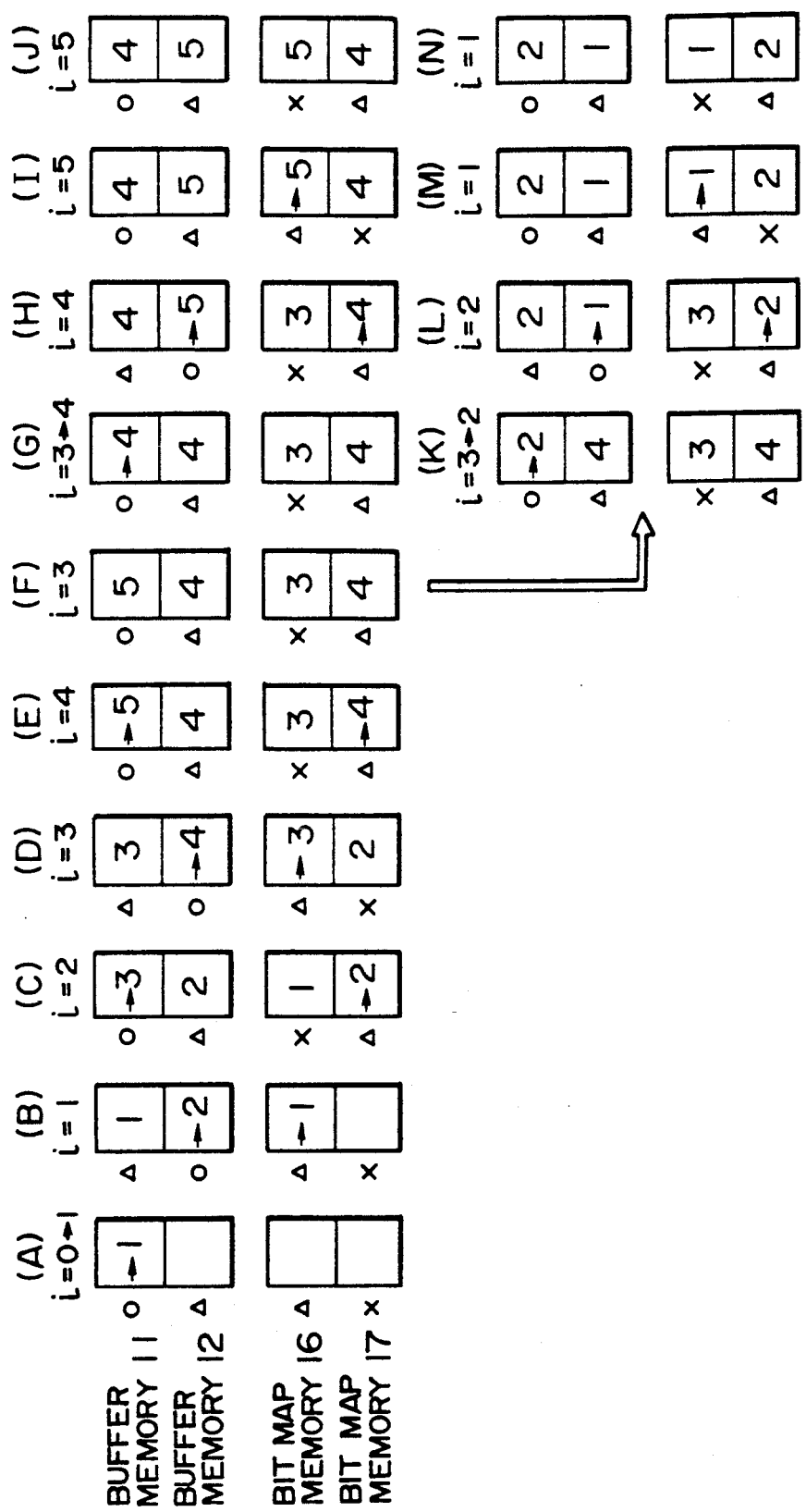
FIG. 6 illustrates a change in status of the buffer memories and bit map memories.

Next, the status change of the buffer memories 11 and 12 and the bit map memories 16 and 17 during the control operation described by the above programs, particularly during the successive display mode, will be described with reference to FIG. 6. In the Figure, a "circle" symbol indicates a buffer memory for use in storing image data read from the file 3 at step 139, 145 or 158, a "triangle" symbol indicates a buffer memory for storing image data to be expanded at step 144, 152, 161 or 170, and a bit map memory for storing expanded image data, and an "x" symbol indicates a bit map memory for storing image data to be displayed on the display unit 5. The display controller 6 uses those bit map memories indicated by an x symbol for refreshing the displayed image data. The numeral in each memory block in FIG. 6 indicates the index record number 84 of the image data to be stored. In this example, the number l of image data to be retrieved is "5". An arrow in front of the numeral in each memory block means that the memory contents are changed to those of the image data having an index number indicated by the numeral.

First, the index table 80 for the five sets of image data retrieved at step 131 is formed in the memory 10. At step 132, the status "A" of "circle", "triangle" and "x" symbols is determined. If a successive read/display command in the ordinary direction is inputted, the parameter i is changed from 0 to 1 at step 137. The first image data is then stored in the buffer memory 11 at step 139. After the completion of storing the image data, the buffer memory is switched at step 141 to obtain status "B". At status "B", simultaneously with storing the first image data expanded at step 144 in the bit map memory 16, reading the second image data and storing it in the buffer memory 12 is executed at step 145. After the completion of expansion, the "triangle" and "x" status of the bit map memories is exchanged at step 148, thus resulting in status "C" whereat the first image data stored in the bit map memory 16 is displayed on the display unit 5 Steps 143 to 151 are repeated to change status from "C" to "E" while sequentially displaying the second and third image data.

Assume that the operator has inputted an end command at the time when the third image data is being displayed. After confirming the completion of expansion of the fourth image data at status "E", step 155 is executed omitting steps 148 to 151. Consequently, the "circle", "triangle" and "x" status "E" does not change to status "F", but the parameter i changes from 4 to 3 at step 157 and the flow remains stopped at step 133. If the operator again inputs a successive read/display command in the ordinary direction, the parameter i is changed to 4 and thereafter, the fourth image data is read at step 139 to obtain status "G". The flow proceeds up to status "I" being same as status "B". At this status, since the parameter i is 5 which equals the index record number 1, the flow changes from step 143 to step 153 whereat the fifth image data is expanded. At step 156 the "triangle" and "x" status of the bit map memories is exchanged to obtain status "J" with the fifth image data displayed. The flow returns to step 133 to wait for the next command.

If the operator inputs a successive read/display command in the reverse direction at status "F", the parameter i is changed to 2 at step 138 and thereafter the second image data is read at step 139 to obtain status "K". Since step 160 follows after step 142, the second image data is displayed in a similar manner to obtain status "M". In this status, the parameter i is 1 so that step 170 follows after step 160 to expand the first image data. At step 174, the "triangle" and "x" status of the bit map memories is exchanged to obtain status "N" with the first image data displayed. The flow returns to step 133 to wait for the next command.

In the above embodiment, five individual command keys 76–80 are prepared for designating an operation mode of image display. However, these commands may be designated by using a reduced number of command keys, for example, a next page key and a former page key. A command for reading and displaying the next one page at a time in an ordinary direction can be inputted by pushing the next page key and releasing it within a predetermined time period. If the next page key is held in the pushed state over the time period, it is judged that a command for successive reading and displaying of image data in an ordinary direction is inputted. Similarly, a command for reading and displaying the next one page at a time in a reverse direction can be inputted by pushing the former page key and releasing it within a predetermined time period. If the former page key is held in the pushed state, it is judged that a command for successive reading and displaying of retrieved image data is inputted. A command for stopping the retrieval process can be judged by detecting the release of key which has been pushed over the time period.

In the above embodiment, the time interval required for replacing the displayed image in successive display mode depends on the time limit for reading respective image data from the image data file 3 to the memory 11 (12), or the time limit for expansion of the image data in the memory 11 (12). However, it is possible to make variable the above time interval by providing the control program shown in FIG. 2B with loop routines of no operation, for example, before the step 148, 156, 165 and 174, respectively. In this case, the operator inputs a numeric value from key board 7 to designate the degree of display interval so that the loop routine is executed repeatedly so many times in proportion to the inputted numeric value. By this function, the operator can change the speed of page flipping arbitrarily.

The image data entry and retrieval modes are executed independently as described in the above description. Therefore, the memory 13 required only during the image data entry mode may be used physically in common with any one of the buffer memories 11 and 12 and the bit map memories 16 and 17.

Although only one expansion processor 15 for image data is used in the above embodiment, the number of expansion processors may be changed especially when the image file 3 having a high data read speed is used and image data is sequentially read and displayed on the display unit at a speed matching the data read speed of the image file. Such an arrangement includes two expansion processors and buffer memories and bit map memories, the latter two memories respectively having a memory capacity corresponding to three frames, or three expansion processors and buffer memories and bit map memories, the latter two memories respectively having a memory capacity corresponding to four frames. Provision of bit map memories having a memory capacity corresponding to a plurality of image frames enables to display one frame while storing expanded image data in another image frame, so that a switch from one image data to another image data on the display unit can be performed instantly, resulting in an image data easy to observe and substantially still. The bit map memories 16 and 17 may be used in common, with the display contents gradually changed from one image data to another image data. In this case, switching the bit map memories in the control flow charts is not needed to thus reduce the memory capacity of the bit map memory.

The above embodiment of the image file system is applied to both image data entry and retrieval. Generally, it is easy for a file medium such as an optical disc to be dismounted from one system and mounted on another system. In view of this, the present invention may be applied to a system with only a retrieval function and without an entry function, whereby a file medium with image data recorded in another system may be used to display the retrieved image data at high speed. In this case, the scanner 1, scanner controller 2, compression processor 14 and image memory 14 shown in FIG. 1 are not needed, and steps 122 to 129 in the control program shown in FIG. 2 can be omitted. Obviously, the image display system according to the present invention is also applicable to the system wherein the file 3 is located in a remote side and the display terminal is connected to the file 3 via a communication line or radio transmission. Further, each command is allocated to a specific control key of the keyboard in the above embodiment. However, each command may be allocated to a specific character string inputted using character keys 71 or a specific key selected from the character keys 71.

As seen from the foregoing description of the present invention, an image data is stored in the image file in compressed form. Two functions can be selectively switched, one for successively displaying a plurality of image data at a speed substantially equal to the data read speed of the image file, and the other for obtaining a still image or changing to the next image in response to a command from the operator. As a result, an objective image data from a plurality of retrieved image data can be found in short time.

The invention claimed is:

1. An image data display system comprising:
a file unit for storing a plurality of variable length image data in compressed form;
a display unit having a display screen for displaying image data;
table means for storing address information of a plurality of image data to be read from said file unit;
a buffer memory having a plurality of memory areas corresponding to at least two image frames for temporarily storing compressed image data read out from said file unit;
means for expanding compressed image data read out from one of the memory areas of said buffer memory;
a bit map memory having at least two image frame memory regions for storing expanded image data to be displayed on said display screen;
means for outputting expanded image data in either one of said two image frame memory regions of said bit map memory to the display unit;
input means for inputting from a user a first command instructing a successive display of image data and a second command instructing a halt of the successive display; and
control means responsive to said first command for automatically switching between at least first and second memory areas of said plurality of memory areas and between said two image frame memory regions of said bit map memory in a predetermined order, respectively, such that said first memory area of said buffer memory is used for storing compressed image data read out from said file unit and said second memory area of said buffer memory and one of said at least two image frame memory regions of said bit map memory are used by the expanding means, and for successively reading out image data from said file unit to said first memory area by referring to said table means while said means for outputting expanded image data is displaying the contents of the other of said two image frame memory regions of said bit map memory on said display screen and said expanding means is processing compressed image data in said second memory area to write expanded image data into said one region of said bit map memory, and responsive to said second command for halting said automatic switching operation of the memory areas and frame memory regions and said successive reading operation of image data from said file unit, whereby a desired image data on the display screen is rendered by said control means to stay on the display screen in response to the second command inputted by said user from said input means during when a plurality of frames of image data are successively displayed on the display screen.

2. An image data display system according to claim 1, wherein said control means switches said two memory regions of said bit map memory in synchronization with the completion of an expanding operation of each image data in said buffer memory and switches between said memory area of said buffer memory in synchronization with a later of the completion of said processing operation or the completion of a read operation of image data from said file unit performed in parallel with said processing operation.

3. An image data display system according to claim 1, further comprising means for designating a period of time to display each of images on said display screen, and said control means including means for switching said two memory regions of said bit map memory in accordance with a time interval corresponding to said designated period of time measured from the previous switching operation executed for said at least two memory regions if the processing operation of each image data in said buffer memory has been completed theretofore.

4. An image data display system according to claim 1, further comprising means for designating a period of time to display each of images on said display screen, and said control means including means for adjusting the timing of switching of said two memory regions of said bit map memory in accordance with said designated period of time.

5. An image data display system according to claim 1, further comprising means for designating a period of time to display each of images on said display screen, and said control means including means for adjusting the timing of switching of said two memory regions of said bit map memory and the timing of switching of the memory areas of said buffer memory in accordance with said designated period of time.

6. An image data display system comprising:
file means for storing a plurality of frames of variable length image data in compressed form;
access means for reading out one frame of image data from said file means in response to a read signal;
buffer memory means divided into at least two memory areas each of which has a memory capacity capable of storing one frame of compressed image data read out from said file means by said access means;
means for expanding image data stored in said buffer memory means;
bit map memory means having at least two frames of memory areas each for storing one frame of image data expanded by said expanding means;
means for displaying image data stored in either one of the memory areas of said bit map memory on a display screen; and
control means for automatically switching between a memory area of said buffer means to be used by said access means to store said image data and another memory area of said buffer memory means to be used by said expanding means, for switching between a memory area of said bit map memory means to be used by said display means and another memory area of said bit map memory means to be used by said expanding means to store an expanded image data and for providing access means with said read signal and said expanding means with a signal to start the operation of an image data expansion for a block of image data before the completion of a read operation of said access means while a frame of image data expanded already resides in said display screen.

7. An image data display system according to claim 6, wherein said control means switches between said memory areas of said buffer memory means when both the read operation of said access means and the expanding operation of said access means and the expanding operation of said expanding means are completed.

8. An image data displaying system according to claim 6, wherein said control means switches between said memory areas of said bit map memory means in synchronization with the completion of a expanding operation of said expanding means and switches between said memory areas of said buffer memory means in synchronization with the completion of a later one of said expanding operation and a read operation of said access means performed in parallel with said expanding operation.

9. An image data displaying system according to claim 6, wherein said bit map memory means has at least two memory areas; and
said control means switches between said memory areas of said bit map memory means used by said displaying means in synchronization with the completion of an expanding operation of said expanding means.

10. An image data displaying system according to claim 6, further comprising means for designating a period of time to display each of images on said display screen, and said control means including means for adjusting the timing of switching of said two memory areas of said bit map memory means in accordance with said designated period of time.

11. An image data display system according to claim 6 further comprising means for designating a period of time to display each of images on said display screen, and said control means including means for adjusting the timing of switching of said two memory areas of said bit map memory means and the timing of switching of the memory areas of said buffer memory means in accordance with said designated period of time.

12. An image data retrieval system comprising:
file means for storing a plurality of pages of variable length image data in compressed form;
means for storing index records corresponding to said image data each of which has index information for retrieving one of said image data and address information for accessing said one image data;
buffer memory means divided into at least two memory areas each of which has a memory capacity capable of storing one page of image data of compressed image data read out from said file means;
means for expanding image data stored in said buffer memory means;
bit map memory means divided into at least two memory areas each for storing image data expanded by said expanding means;
means for displaying image data stored in said bit map memory means on a display screen;
input means for inputting, by user, index information to specify image data to be retrieved and operation commands one of which designates a mode of image data display on said display screen;
table means for storing address information of retrieval image data to be displayed on said display screen; and
control means including means for retrieving index records from said index storing means in accordance with index information of image data designated by the user through said input means to store retrieved index records in said table means, and means, responsive to an input command from said input means, for successively reading out a plurality of image data on the basis of address information included in said retrieved index records in said table means by automatically changing a memory area of said buffer memory means to be used to store said image data for every page and for successively operating said expanding means in parallel or simultaneously with said read out operation so as to expand image data which has already been read into one of said areas of said buffer memory means by automatically changing one of said at least two memory areas of said bit map memory means to be used to store one page of expanded image data and the other of said at least two memory areas of said bit map memory means to be accessed by said display means when said input command designates a successive display mode.

13. An image data retrieval system according to claim 12, wherein said control means comprises means responsive to an input command from said input means for reading out one page of image data on the basis of address information included in one of said retrieved index records stored in said table means by changing a memory area of said buffer memory means to be used to store said image data, for operating said expanding means so as to expand said one page of image data after said image data has been read into one of said areas of said buffer memory means by changing a memory area of said bit map memory means to bused to store one page of expanded image data and a memory area of said bit map memory means to be accessed by said display means and for waiting for a next command from said input means when said input command designates a display mode to advance the display operation step by step.

14. An image data retrieval system according to claim 12, further comprising means for designating a period of time to display each of images on said display screen, and said control means including means for adjusting the timing of switching of said two memory areas of said bit map memory means in accordance with said designated period of time.

15. An image data retrieval system according to claim 12, further comprising means for designating a period of time to display each of images on said display screen, and said control means including means for adjusting the timing of switching of said two memory areas of said bit map memory means in accordance with said designated period of time.

16. An image data retrieval system according to claim 12, further comprising means for designating a period of time to display each of images on said display screen, and said control means including means for adjusting the timing of switching of said two memory areas of said bit map memory means and the timing of switching of the memory areas of said buffer memory means in accordance with said designated period of time.

* * * * *

UNITED STATES PATENT AND TRADEMARK OFFICE
CERTIFICATE OF CORRECTION

PATENT NO. : 5,150,462
DATED : September 22, 1992
INVENTOR(S) : Haruo Takeda, Kuniaki Tabata It is certified that error appears in the above-indentified patent and that said Letters Patent is hereby corrected as shown below:

On the Title page, item [21] Appli. No.: should read
--437,706--.

Signed and Sealed this

Twelfth Day of October, 1993

Attest:

BRUCE LEHMAN

Attesting Officer  Commissioner of Patents and Trademarks